United States Patent
Connors

(10) Patent No.: US 10,576,668 B1
(45) Date of Patent: Mar. 3, 2020

(54) MOLD CORE AND A METHOD OF USE IN CREATING A PALLET WITH A CURVED OPENING

(71) Applicant: REMCON PLASTICS INCORPORATED, Reading, PA (US)

(72) Inventor: Peter James Connors, Radnor, PA (US)

(73) Assignee: Remcon Plastics, Inc, Reading, PA (US)

( * ) Notice: Subject to any disclaimer, the term of this patent is extended or adjusted under 35 U.S.C. 154(b) by 0 days.

(21) Appl. No.: 15/998,607

(22) Filed: Aug. 21, 2018

(51) Int. Cl.
*B29C 41/04* (2006.01)
*B29C 41/40* (2006.01)
*B65D 19/00* (2006.01)
*B29C 33/44* (2006.01)
*B29C 33/76* (2006.01)
*B29L 31/00* (2006.01)

(52) U.S. Cl.
CPC ............ *B29C 41/40* (2013.01); *B29C 33/444* (2013.01); *B29C 33/76* (2013.01); *B29C 41/042* (2013.01); *B65D 19/0012* (2013.01); *B29L 2031/7178* (2013.01); *B65D 2519/00034* (2013.01); *B65D 2519/00069* (2013.01); *B65D 2519/00268* (2013.01); *B65D 2519/00288* (2013.01); *B65D 2519/00318* (2013.01)

(58) Field of Classification Search
CPC ............ B29C 2031/7178; B29C 41/04; B29C 41/042; B29C 41/045; B29C 41/047; B29C 41/06; B29C 41/38; B29C 41/40; B29C 33/444; B29C 33/76
See application file for complete search history.

(56) References Cited

U.S. PATENT DOCUMENTS

| | | | | |
|---|---|---|---|---|
| 3,759,194 A * | 9/1973 | Fujii | ................... | B65D 19/0012 108/57.28 |
| 3,795,206 A * | 3/1974 | Utz | ...................... | B65D 19/0016 108/57.28 |
| 3,814,778 A * | 6/1974 | Hosoda | ................... | B29C 41/04 264/45.4 |
| 6,508,182 B1 * | 1/2003 | Smorgan | ................. | B29C 45/26 108/57.25 |
| 6,843,461 B2 * | 1/2005 | Braungardt | ............. | B28B 7/303 249/176 |
| 8,758,007 B2 * | 6/2014 | Liu | ........................ | B29C 45/332 425/556 |

(Continued)

FOREIGN PATENT DOCUMENTS

DE 2136644 A1 * 2/1973 ............. B29C 45/33

*Primary Examiner* — Atul P. Khare

(74) *Attorney, Agent, or Firm* — Jonathan E. Grant; Grant Patent Service

(57) ABSTRACT

An asymmetric mold core and method for use for forming curved floor openings in pallets is taught. The mold core contains: a base, the base attachable to a frame in a rotomold, a bottom section integral at a distal end to the base, and a top section integral at a distal end to the base. Both the top section and the bottom section have convex radial curve shape, but the top section curve and the bottom section curve are positioned by having different centers of rotation so when the core is actuated it is only actuated around the center of rotation about the bottom curve which causes the top cure to drop away from the upper molded surface.

12 Claims, 17 Drawing Sheets

(56) References Cited

U.S. PATENT DOCUMENTS

| | | | |
|---|---|---|---|
| 2006/0013991 A1* | 1/2006 | Hoogland | B65D 19/0048 |
| | | | 428/119 |
| 2009/0114129 A1* | 5/2009 | Smith | B29C 70/865 |
| | | | 108/57.25 |
| 2011/0179978 A1* | 7/2011 | Schmitt | B29C 45/2628 |
| | | | 108/53.3 |

* cited by examiner

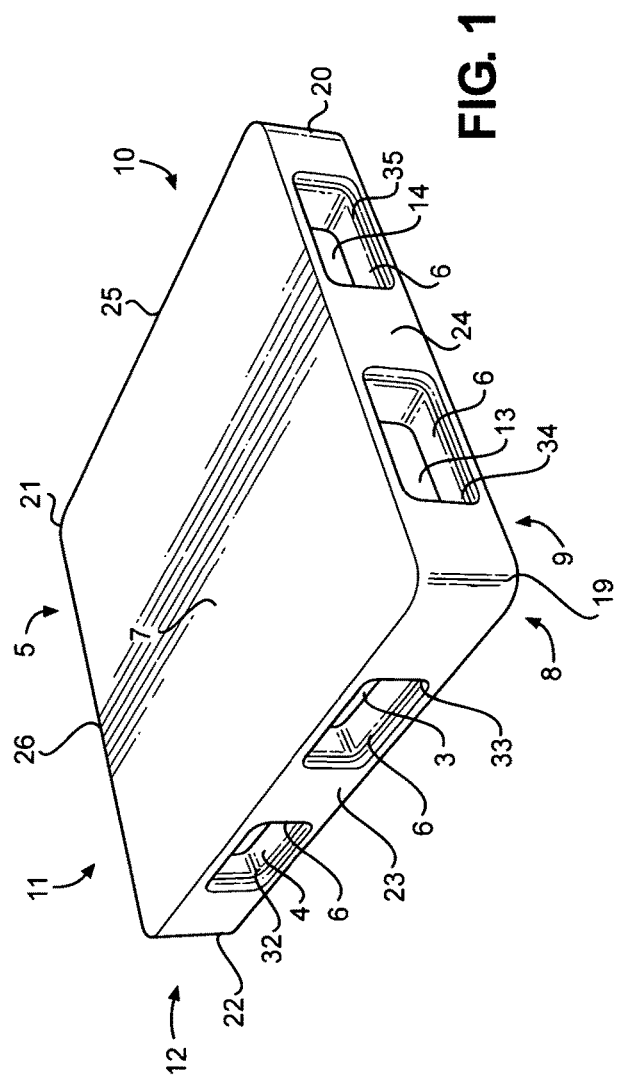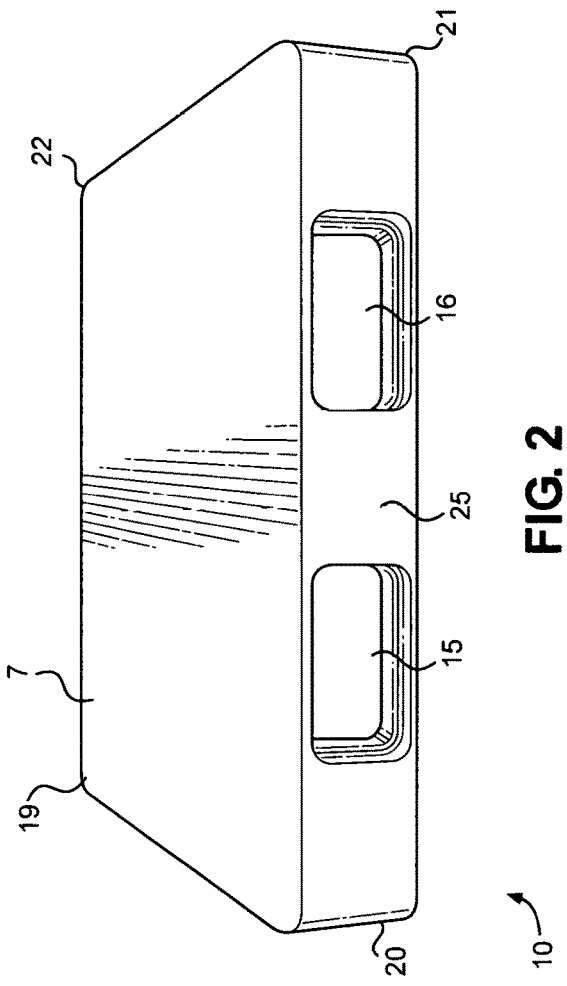

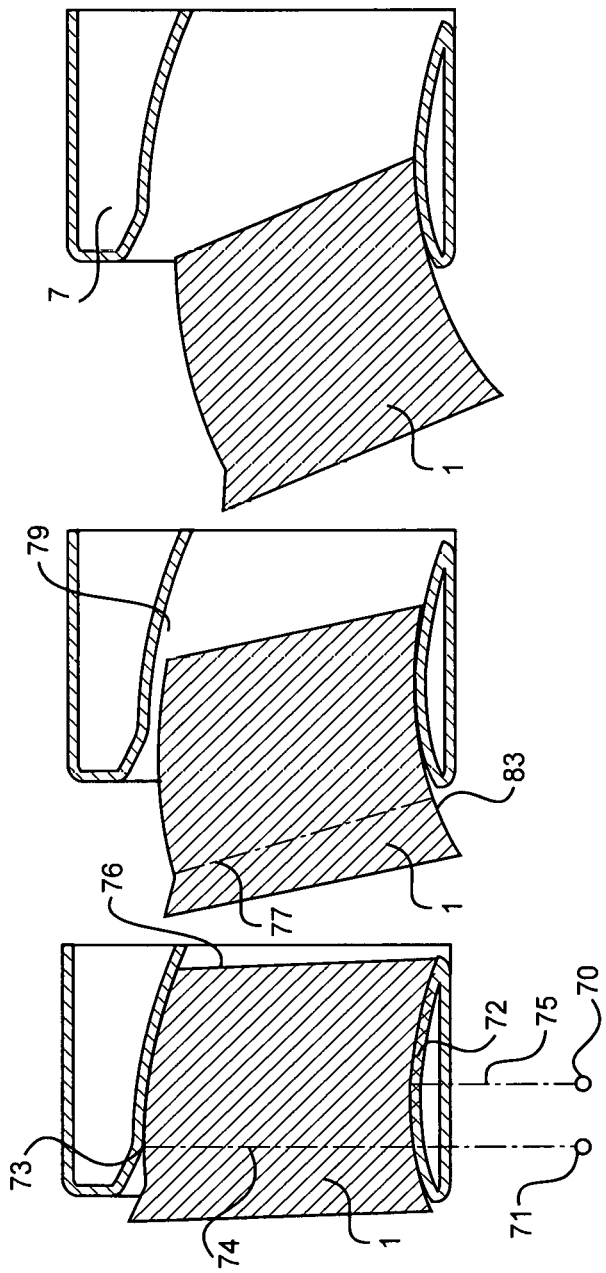

MOLD CORE AND A METHOD OF USE IN CREATING A PALLET WITH A CURVED OPENING

A mold core for a rotomold and a method of use for creating a curved opening in the rotomolding of a pallet is disclosed.

BRIEF DESCRIPTION OF THE FIGURES

FIG. 1 is a perspective view of a pallet;
FIG. 2 is a side view of the pallet of FIG. 1;
FIG. 9 is a side view showing the mold core inserted into the mold, as the plastic hardens around it;
FIG. 10A is a side view showing the mold core as it is being withdrawn from the opening formed by the mold;
FIG. 10B is a side view showing the mold core as it is further withdrawn from the opening formed by the mold.

Figure 3:
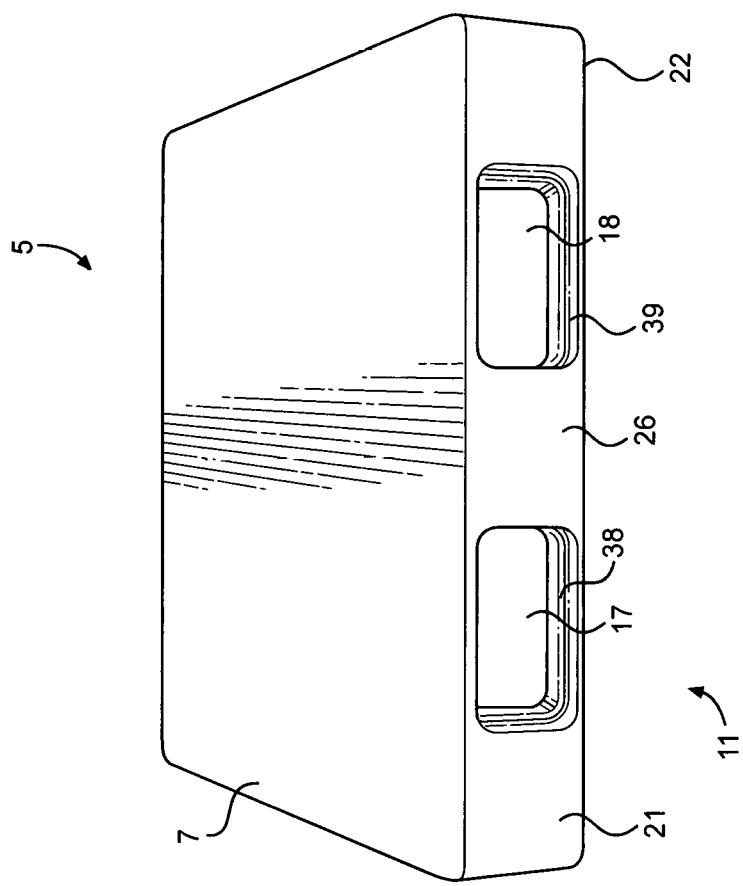
FIG. 3 is another side view of the pallet of FIG. 1.
Figure 4:
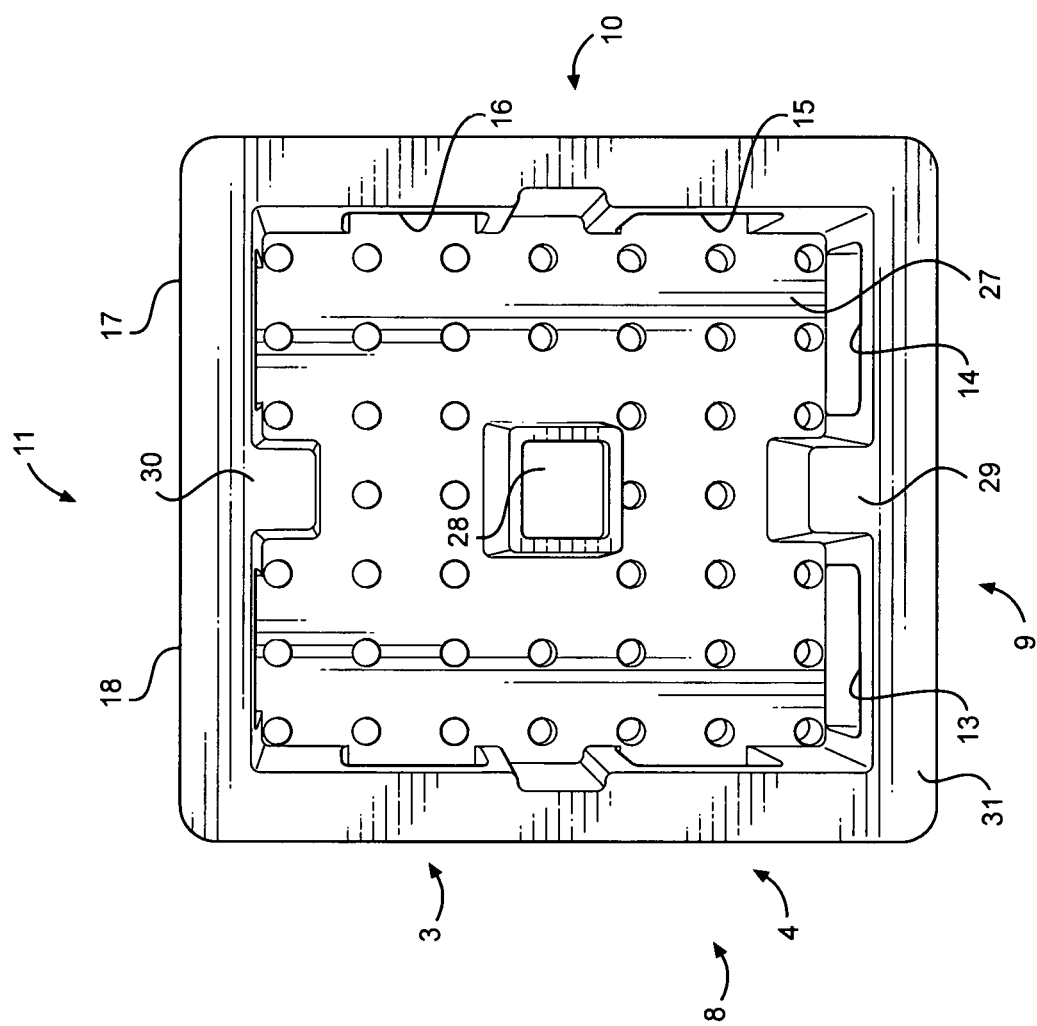
FIG. 4 is an underside view of the pallet of FIG. 1.
Figure 5:
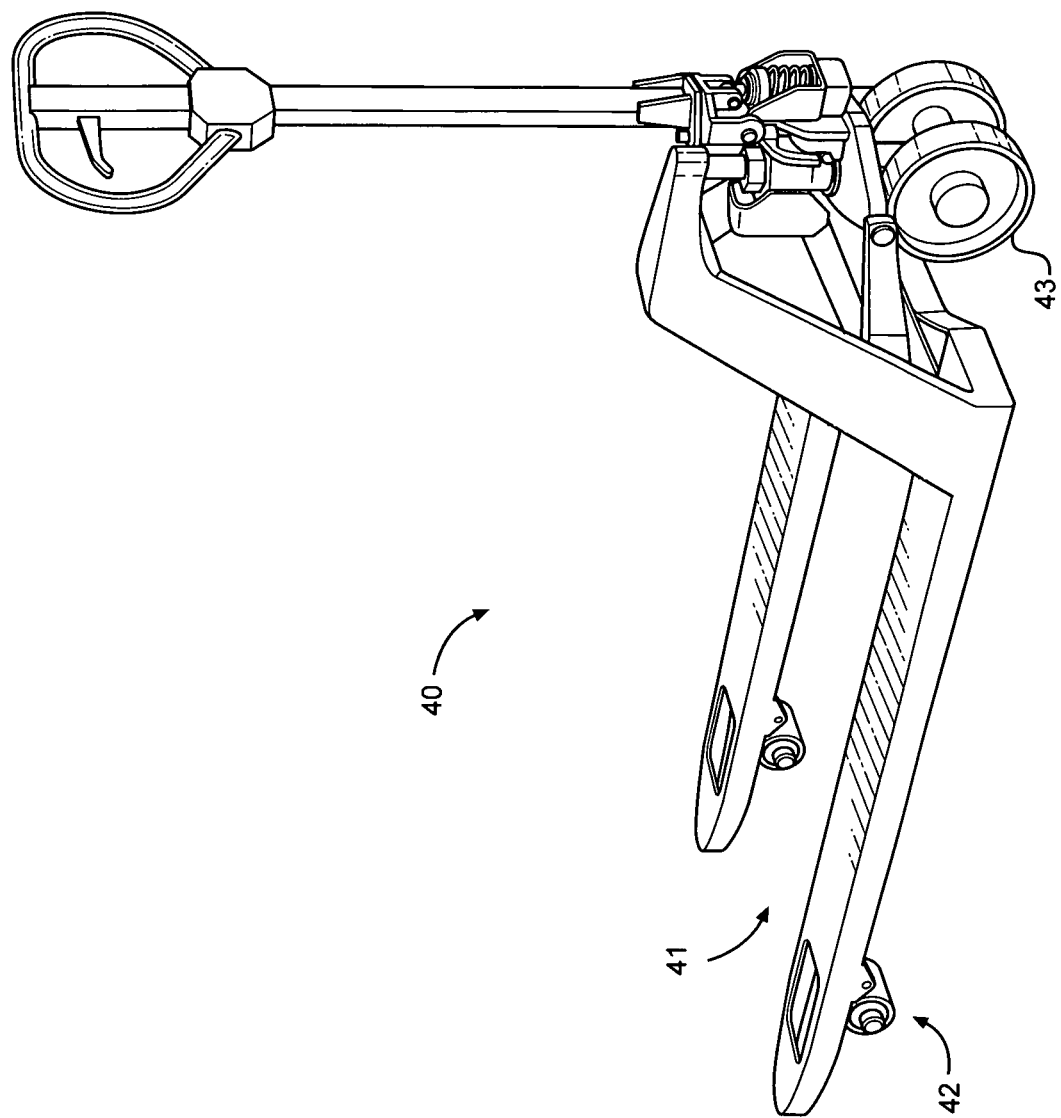
FIG. 5 is a pallet jack.
Figure 6:
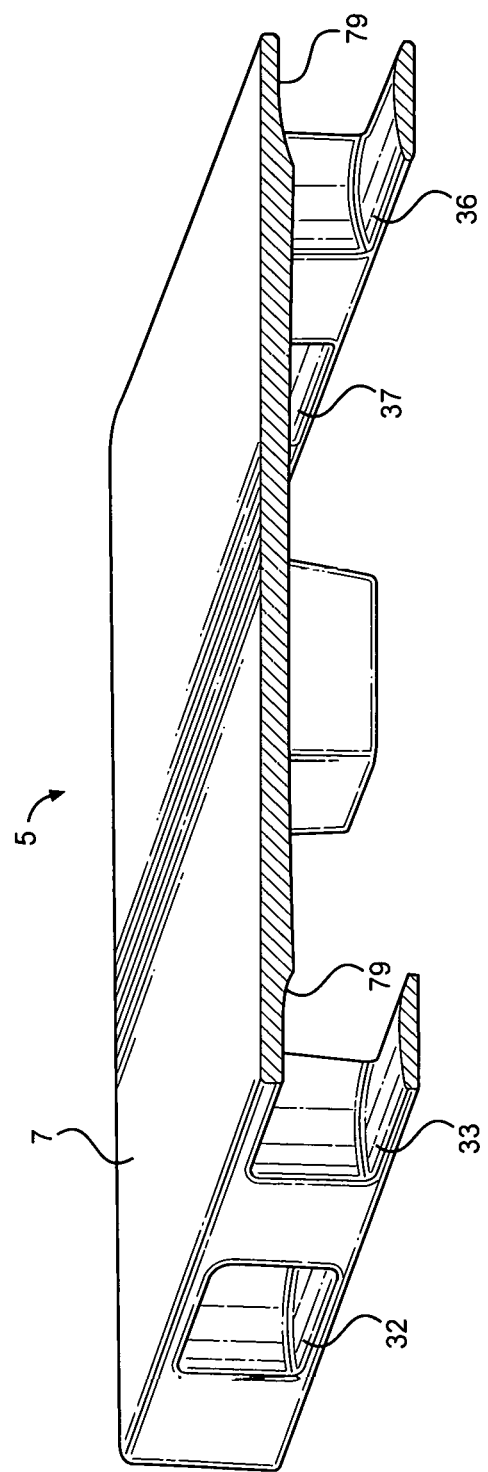
FIG. 6 is a cutaway side view of the pallet.
Figure 7:
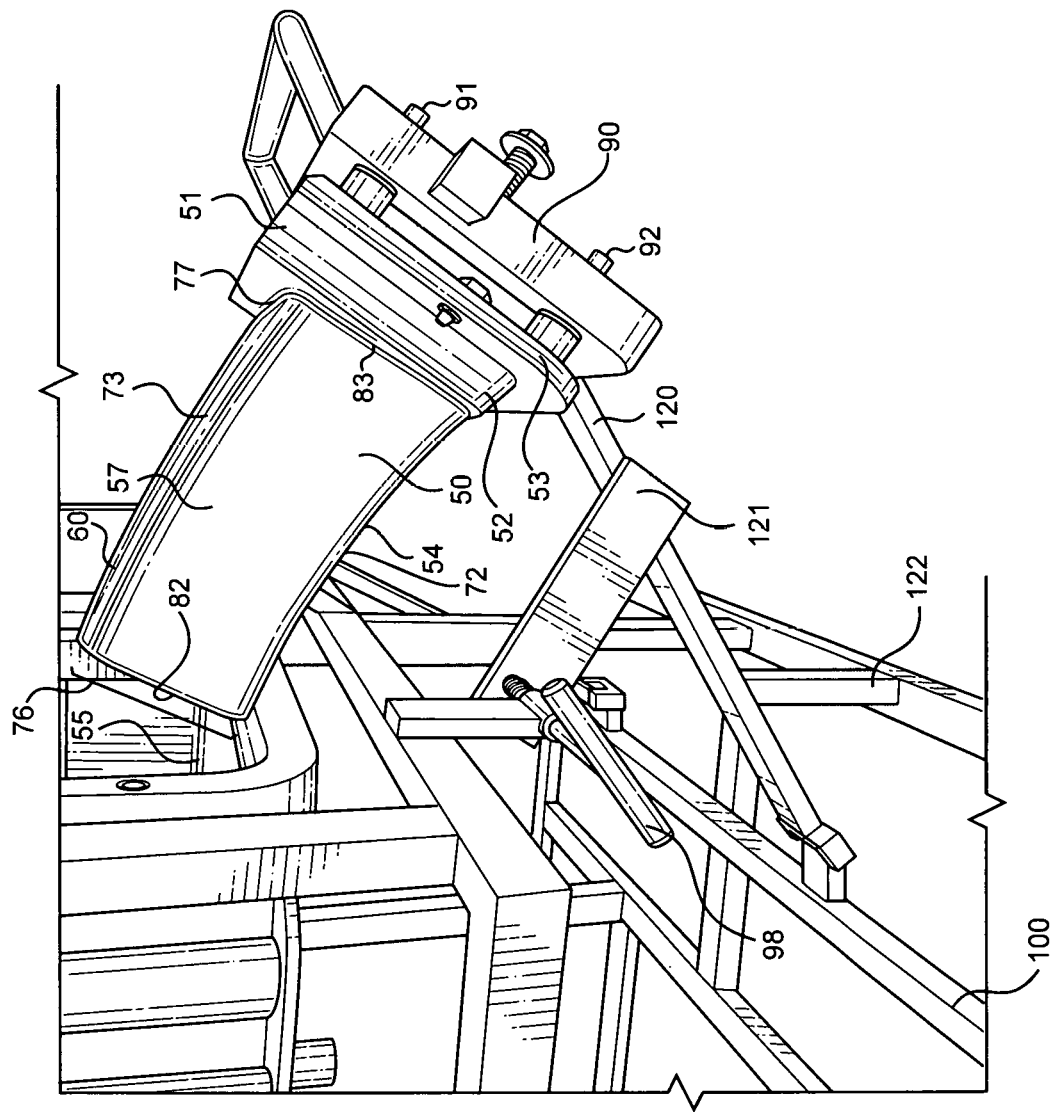
FIG. 7 is a side view of a mold core.
Figure 8:
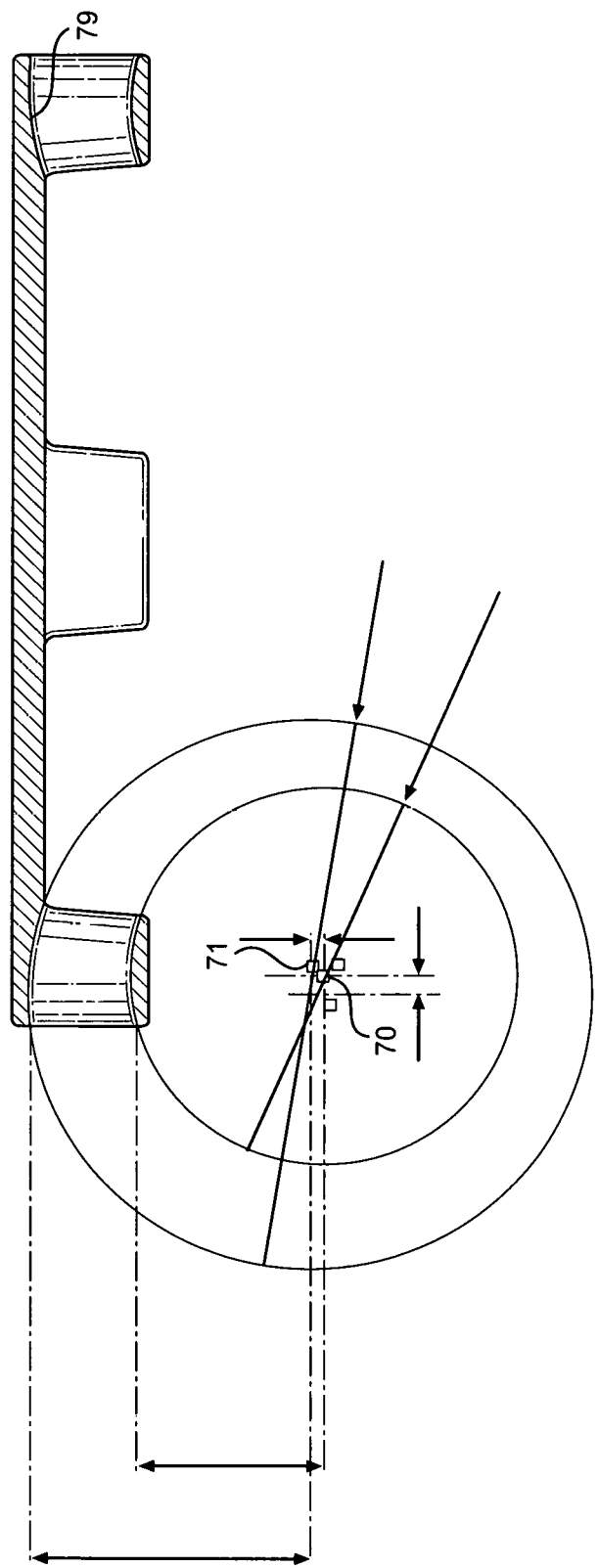
FIG. 8 is a figure showing the radius and noncentric circles that would be formed by the of the bottom section and top section of the mold core.
Figure 11:
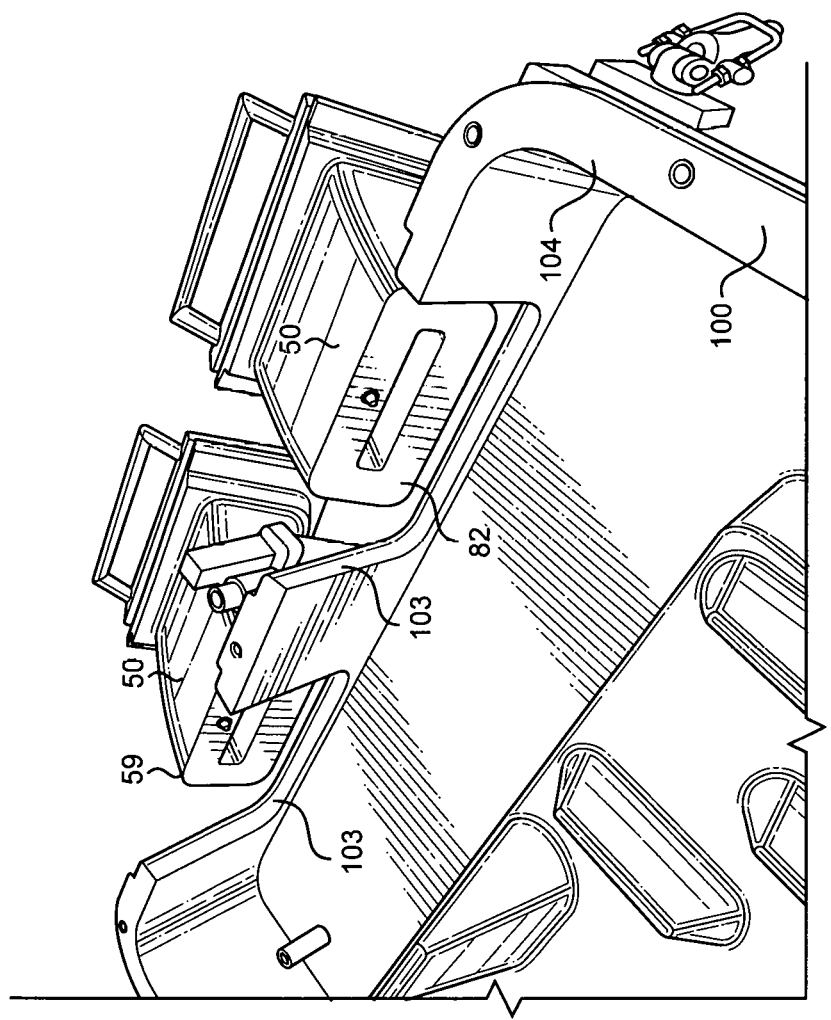
FIG. 11 is an overhead perspective view of two mold cores positioned before the openings of the central mold.
Figure 12:
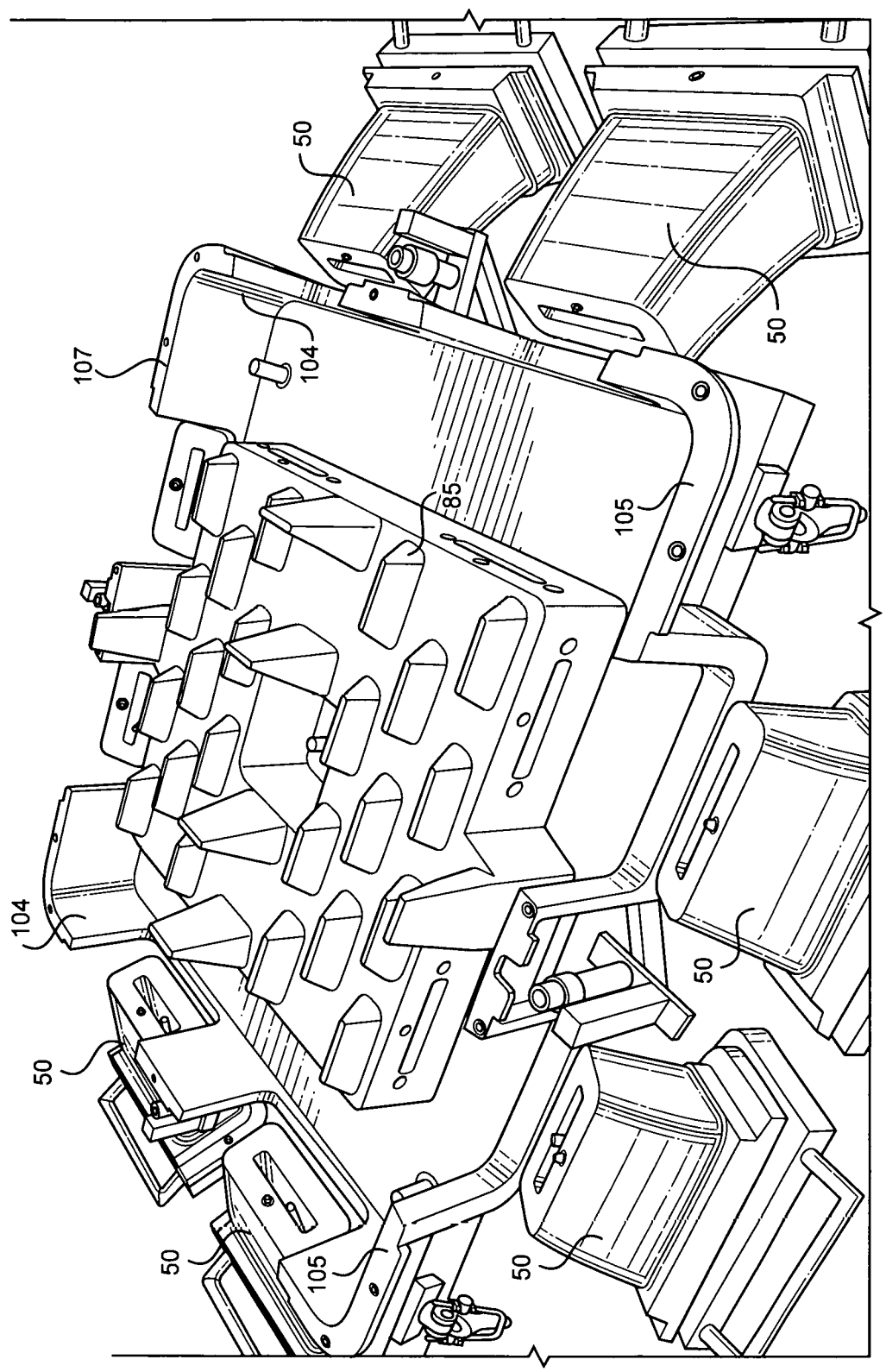
FIG. 12 is an overhead view of the mold in the frame
Figure 13:
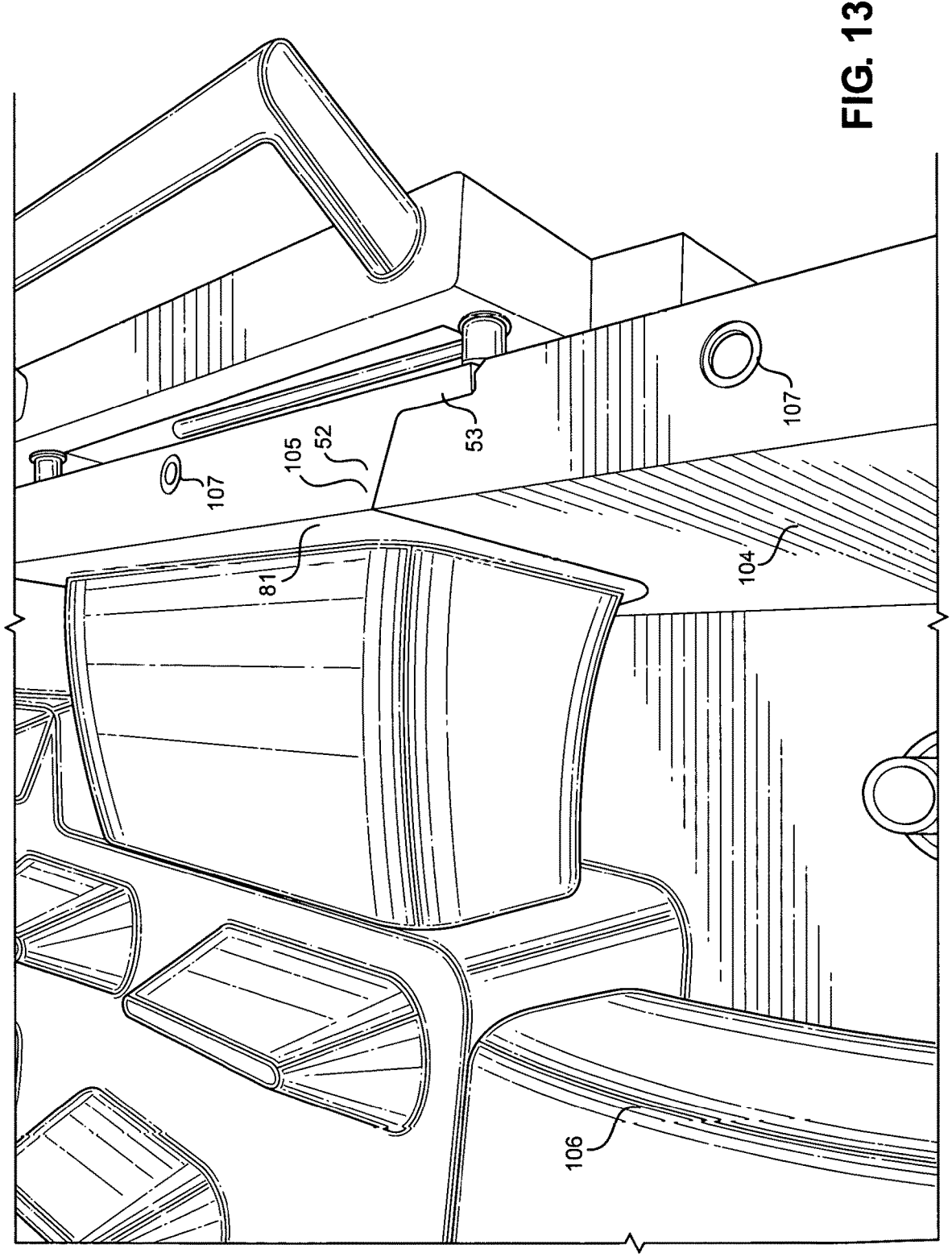
FIG. 13 is a perspective view showing the fit of the mold core base with the central mold for the pallet.
Figure 14:
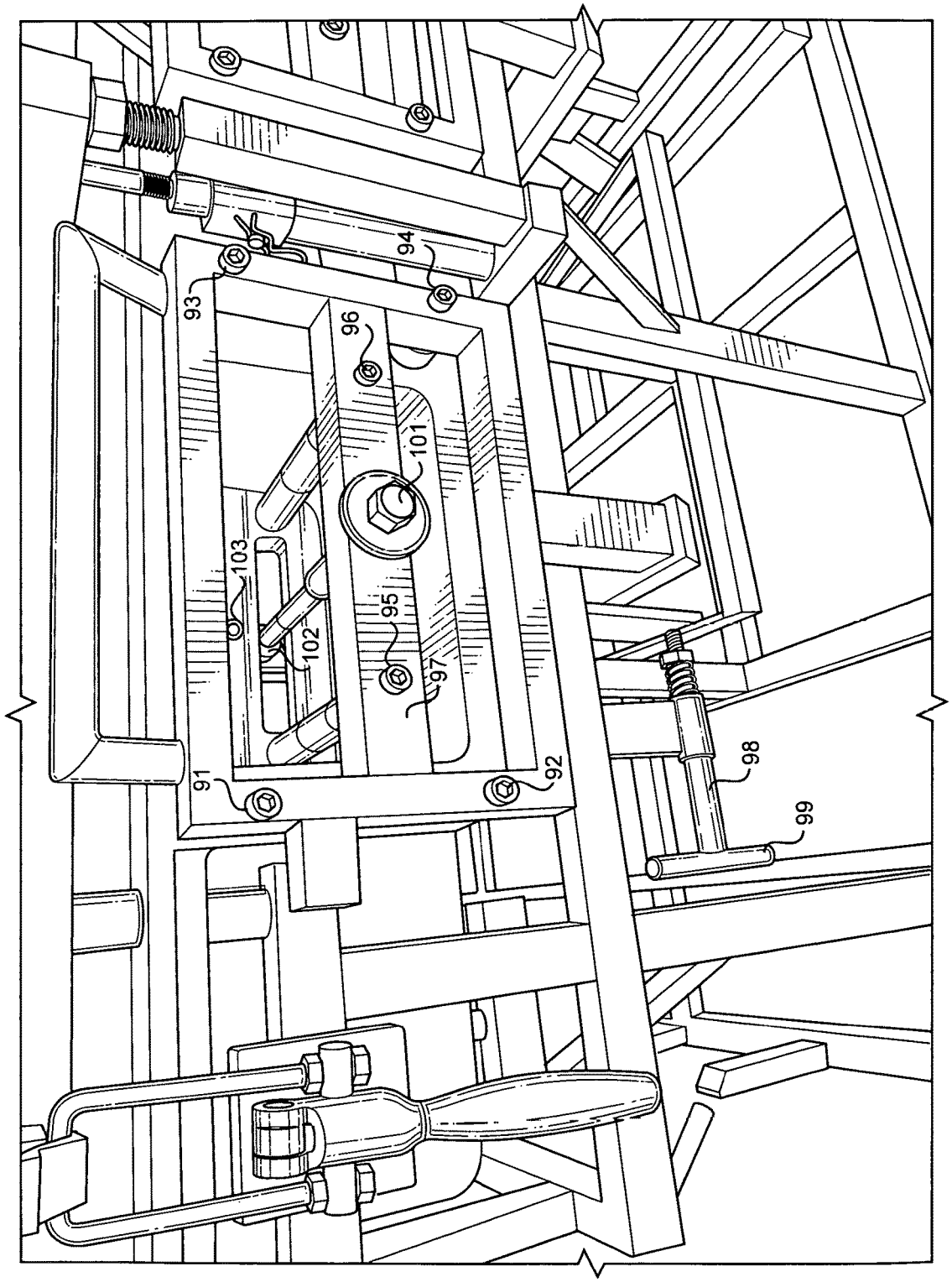
FIG. 14 is a front perspective view of the frame door as it is attached to the mold.
Figure 15:
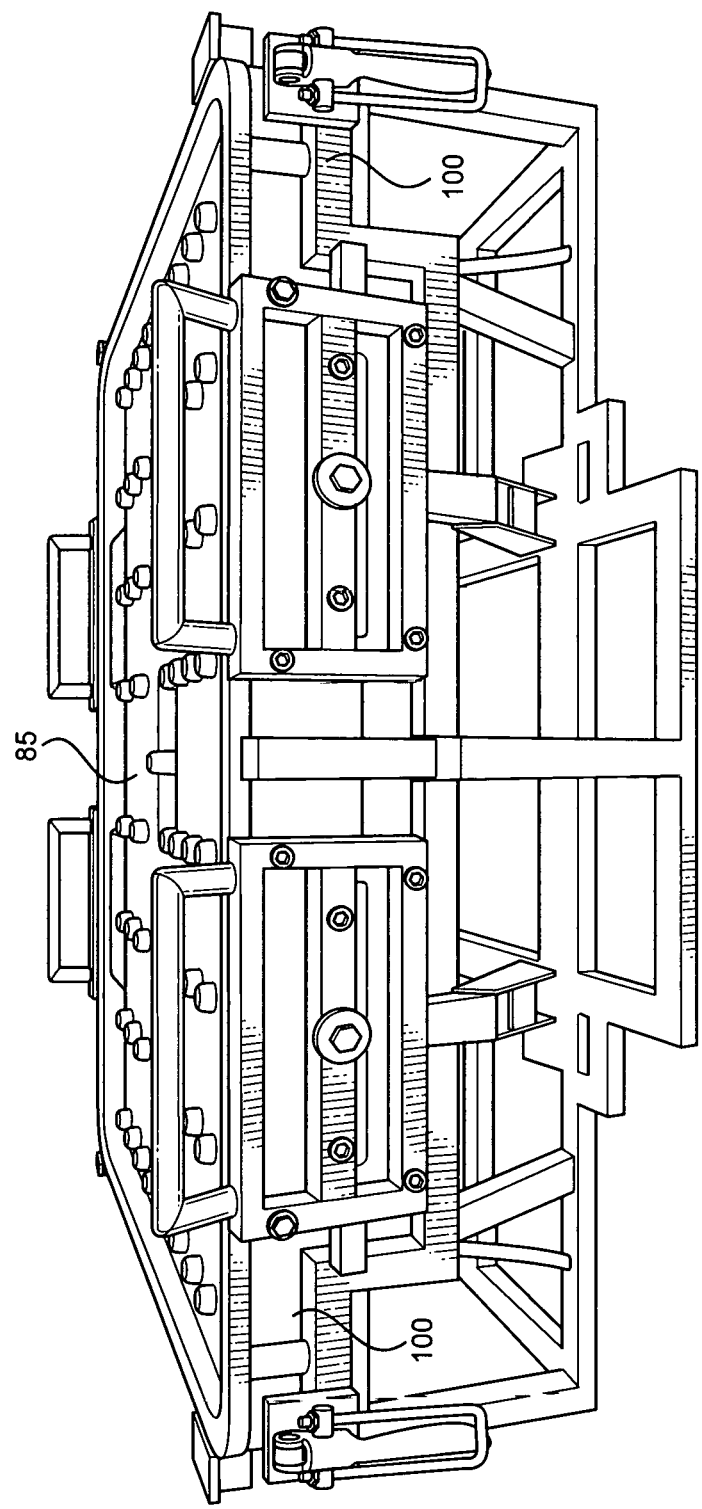
FIG. 15 is a side view of the frame doors in the closed position against the frame and the central mold.
Figure 16:
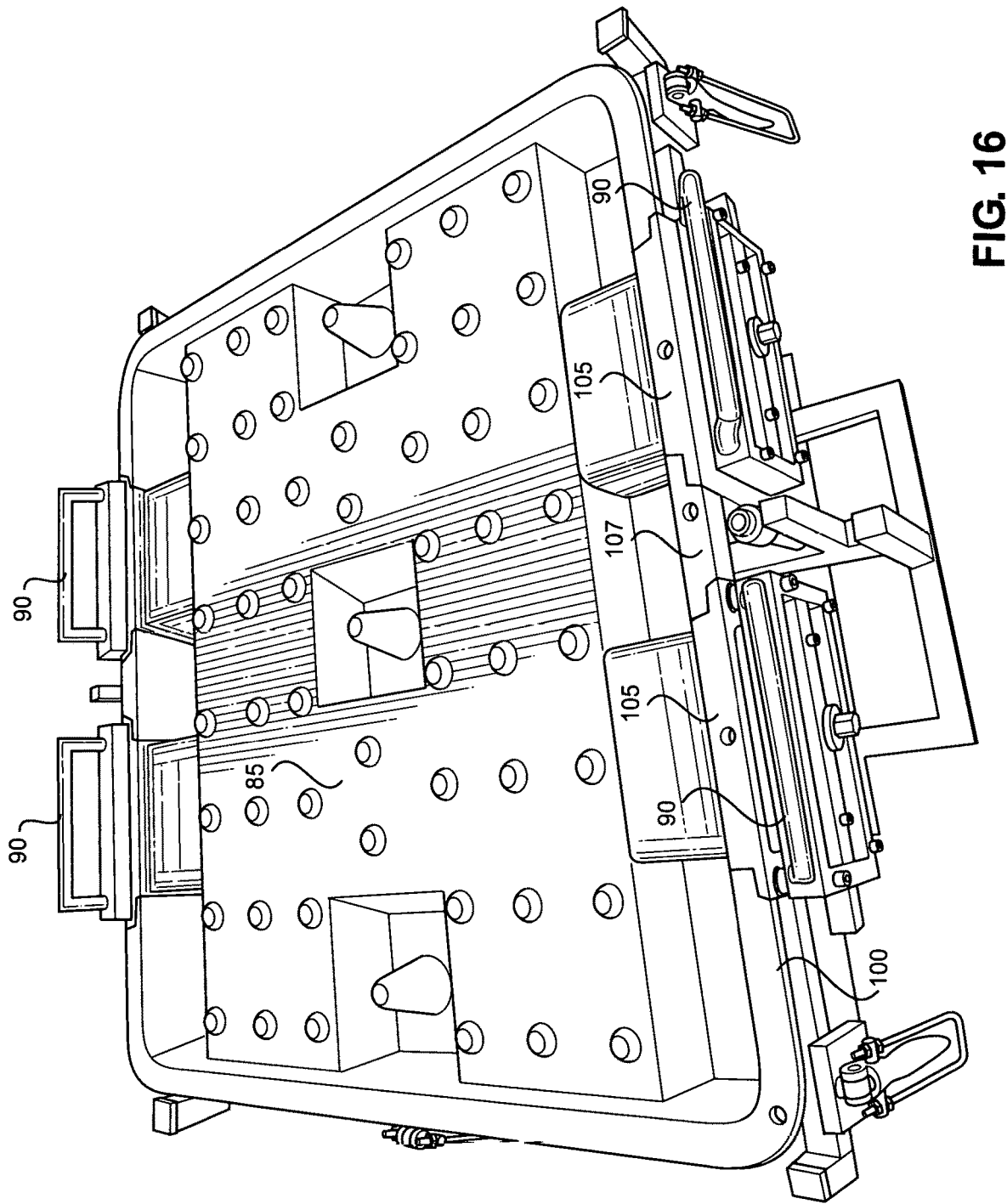
FIG. 16 is a perspective overview of one embodiment of the central mold.

The figures depict various embodiments of the described methods and system and are for purposes of illustration only. One skilled in the art will readily recognize from the following discussion that alternative embodiments of the methods and systems illustrated herein may be employed without departing from the principles of the methods and systems described herein.

DETAILED DESCRIPTION OF THE EMBODIMENT

The present disclosure is for a mold core that is used in a rotomold to form the openings 3, 4, 13, 14, 15, 16, 17, 18 of a pallet 5.

Integrally a molded pallet 5 has a top deck 7, and a bottom support section 12. The bottom support section 12 has four walls or sides 8, 9, 10, 11. On at least one of the sides, there are two openings 3, 4. In another embodiment, there are two openings 3, 4, 13, 14, 15, 16, 17, 18, on each side 8, 9, 10, 11 of molded pallet 5. In another embodiment, there are two openings on two opposing sides. There are four corner posts 19, 20, 21, 22. Furthermore, there is a bisecting post 23, 24, 25, 26, between the openings on each side 8, 9, 10, 11. Additionally, in another embodiment on an underside 27 of the pallet 5, there is an integrally molded support block 28, generally positioned in the middle of the 27 of the pallet 5. In yet another embodiment, there are further support blocks 29, 30 positioned integrally and behind two of the bisecting posts. In another embodiment, there are support blocks integrally molded and behind all of the bisecting posts (not shown).

For further strength, runners 32 33, 34, 35, 36, 37, 38, 39 are integrally molded above and as part of the rim, and are positioned in said openings 3, 4, 13, 14, 15, 16 , 17, 18.

Hand operated pallet jacks 40 are used to move the pallets from one location to another. Because the pallet jack 40 has wheels that must go through the openings 3, 4, or 3 ,4, 13, 14, 15, 16, 17, 18, it is advantageous that the runners 32, 33, 34, 35, 36, 37, 38, 39 of the rotomolded pallet be curved, so that the wheels 41, 42, are not going over a rectangular bump. In order for the runners to be molded in a curve, however, a particular mold core 50 is used to form the openings. The mold core 50 can be made out of aluminum, stainless steel, steel, or any other appropriate metal. It could even be made out of a resin. This mold core 50 has or is made up of, at its distal end, a base assembly 51. The base assembly 51 can have a base 52 and flange 53 which are connected to each other. The base 52 positions the core in the mold. In one embodiment, the base 52 and the flange 53 are integral to one another or cast together, or cast with the entire mold 50.

Referring now to the active part 57 of the mold 50, a bottom section or bottom side 54 of the mold core 50 is convexly curved and in one embodiment is integral with the base assembly 51 at its distal end. When the mold core is inserted into the open side 55 of the mold and when the liquid or powdered plastic is added and melted, the curved runners will form under the bottom side or section 54 of the mold core.

The mold core 50 also has two sides 55, 56 that are integral with the bottom section 54 and with the base assembly 51 and their ends. There is also a front side or face 82 to which the sides 55, 56 are attached at their proximal ends. In one embodiment, the active part of the mold is integral.

The active part 57 of the mold core 50 also has an upper section 58. This upper section 58 is connected to, and in one embodiment integral with the base assembly 51 at its distal end and to the top of sides 55, 56, at the sides 59, 60. This upper section 58 has a convex curve 73; however, this convex curve 73 is not in parallel with the convex (lower) curve 72 of the bottom section 54.

As the plastic work hardens, or strain hardens, the plastic shrinks around the mold. If curves 72 and 73 are parallel, then the shrinking plastic would grab the mold core 50 and make it difficult to remove from the molded object. Consequently, so that the mold core 50 does not get embedded or trapped in the openings 3, 4, 13, 14, 15, 16, 17, 18 by the hardened plastic, the upper curve 73 is oriented around a different center of rotation 71 than that of the center of rotation 70 of the convex (lower) curve 72, thereby creating a core geometry where the upper curve 73 and the lower curve 72 are not parallel. If the center of rotation of the upper curve 73 is outboard of the center of rotation of the lower curve 72, the two curves are divergent towards the base assembly 51. This geometry creates a "rotational draft."

Of course, the radius 74 of the convex curve 73 of the upper section 58 is longer than that of the radius 75 of the convex curve 72 of the bottom section 54. It should be noted that different customers for the pallet have different needs for different sized pallets, differently curved floors, etc., and consequently the radii and the center of rotation of the curves vary. It should be noted that in one embodiment, the height 76 of the proximal end or face 82 of the mold core 50 is less than the height 77 of the distal end 83 of the active part 57 of the mold 50.

The mold core 50 is inserted into a gap 78 in the central mold also known as the body of the mold 85, and the plastic is heated and distributed around the mold core 50. When it is time to remove the mold core 50, the mold core is rotated out of the now molded opening 3, 4, 13, 14, 15, 16, 17, 18. As the mold core is rotated out of molded opening, the upper section 58 with the convex curve 73 actually rotates away from the curve formed in the ceiling 79 of the opening, also known as the ceiling curve 79. This allows for easy removal of the mold core from the molded opening.

In one embodiment, the mold core 50 has a hollow pass through 81 extending laterally through the entire mold core, from the proximal end or face 82 of the mold core 50 out through the base assembly 51. This hollow pass through 81 allows for air flow or heat transfer along the length of the mold core 50. The width of the mold core surrounding said pass through ranges from about ½" to about 2".

The process begins by obtaining the central mold or the body of the mold 85. The central mold or body of the mold 85 is attached to or fitted into a main frame 100. Attached to the main frame are rotatable or pivotable frame doors 90. The frame doors 90 are connected to and pivot about by means of a pivot arm 120 which are attached to the main frame 100 by a hinge pin located at the center or rotation of the lower arc of the core. Cores are held in the open position for de-molding by a spring actuated locking pin 98. The locking pin 98 has a handle 99. A pivot arm lock 122 and a locking plate 121 provide support and control for the pivot arm 120.

In one embodiment, a base assembly 51 of the mold core 50 is attached to a frame door 90, with large screws or threaded bolts 91, 92, 93, 94. In the embodiment shown, the frame door is bolted to the flange 53. Furthermore, there can be at least two additional points of attachment 95, 96 of a middle cross bar 97 of the frame door 90 attaching the frame door 90 to the base assembly 51 of the mold core 50.

In another embodiment, a long bolt 101 centered through the frame doors 90 connects and secures the frame door 90 to a female threaded receptor 102 which is part of and secured to the main frame 100. Other smaller screws (for example screw 103) attach the base 51 or in one embodiment, the flange 53, directly to the main frame 100. In an alternative embodiment, the mold core 50 can be held in place by any other means known in the art, including clamps, shorter bolts, screws, etc.

Figure 17:
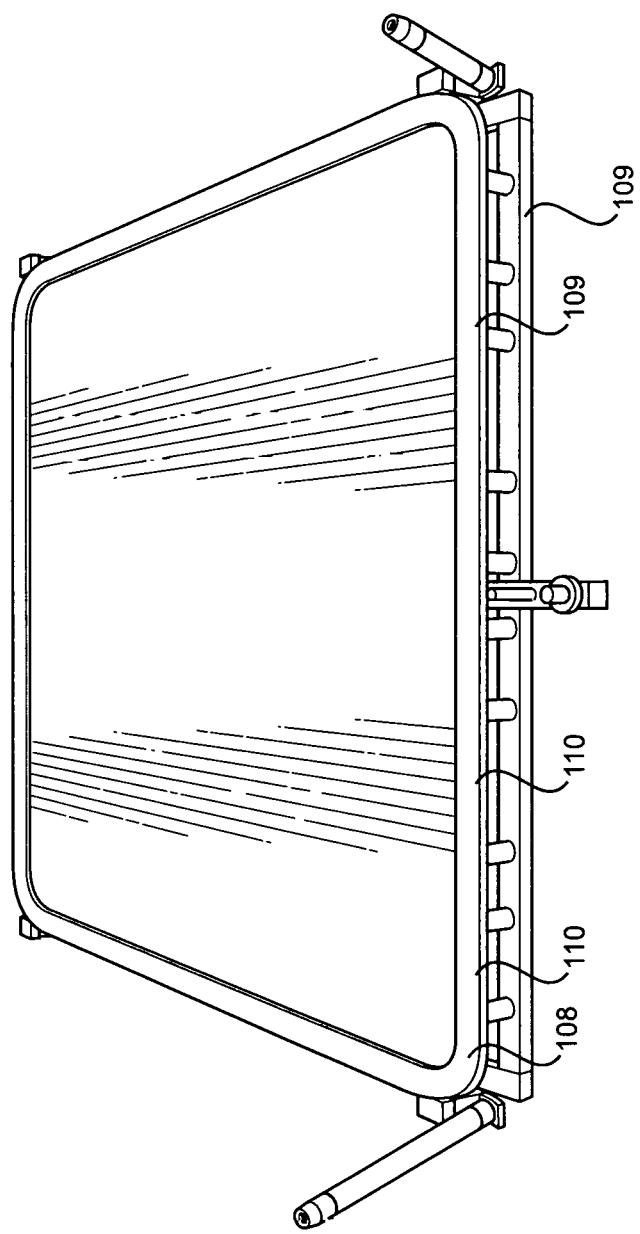
FIG. 17 is an overhead view of the lid of the frame of the mold.

The outer rim 104 of the central mold 85 has a door frame opening 103 and openings in the rim 104 which are filled when frame doors 90 containing the mold core 50 are closed. The top edge 105 of the base 81 and the door frame openings 103 complements and are filled by the base 81 while at the same time the active part of the mold core 57 is positioned against the central part 106 of the mold 85 There are a plurality of threaded holes 107 along the top of the edge 105. These holes 107 will be used to seal the mold lid 108 of the central mold 85 to the frame 100. More specifically, the mold lid 108, shown in FIG. 17, fits over the central mold 85. This mold lid 108 has a rim 109 with a plurality of holes 110 so that it can be attached and bolted down to the central mold 85. The lid 108 is supported by the upper frame 111.

Figure 18:
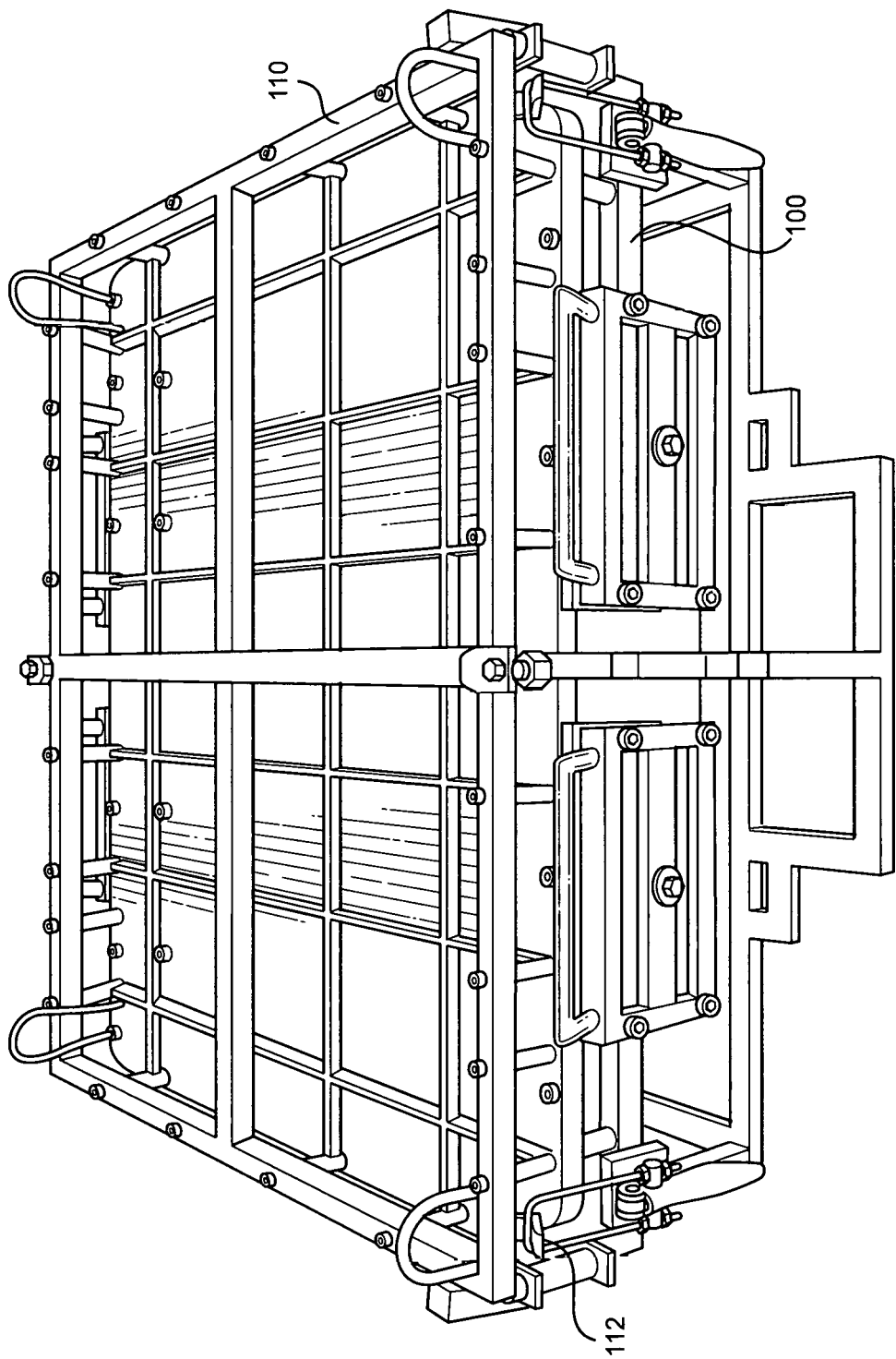
FIG. 18 is an overhead view of the frame locked and surrounding the mold.
Figure 19:
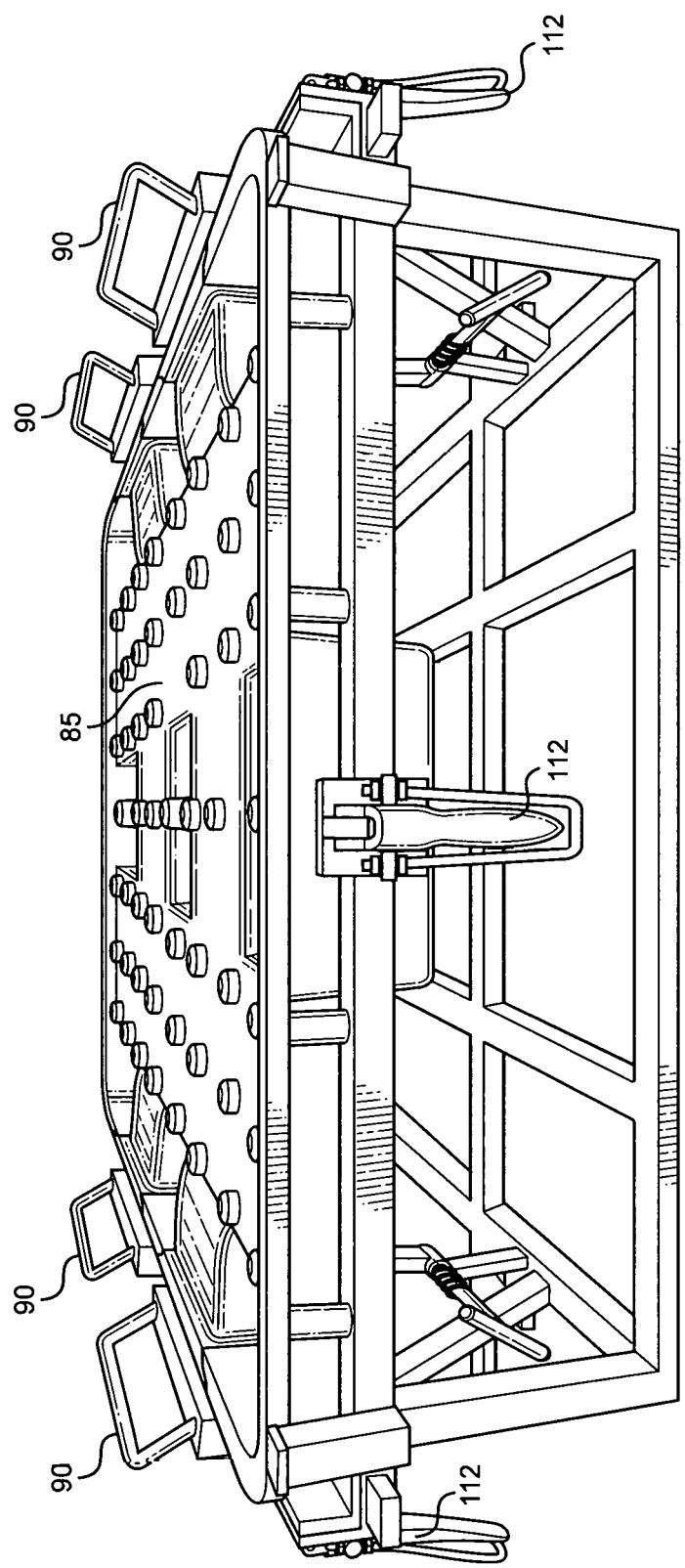
FIG. 19 is a perspective view of an alternative embodiment of the mold.

As shown in FIG. 18, the lid is configured to attach to the central mold and the upper frame and the lower frame are attached. The holes 110 surrounding both the lid 108 and the threaded holes 107 along the top of the edge 105 can be used to attach and seal the mold and the lid or can be used to attach the upper frame 111 to the main frame while simultaneously securing the main mold 85. Latches 112 positioned at each corner of the further allow for a locking of the frame.

The plastic powder or liquid used to form the mold is added prior to locking up the frame, or is added through distinct openings that run into the mold. Once the plastic powder (usually PCV) is added, the frame is mounted into a rotomold which heats and rotates the mold in different axis so as to equally distributed the now melted plastic. Once the plastic begins to harden, it is cooled and removed from the frame for any further treatment such as trimming of excess plastic.

The mold core 50 can used in other molding processes, and not just for the creation of pallets.

Although the disclosure has been illustrated and described in detail in the drawings and foregoing description, the same is to be considered as illustrative and not restrictive in character—it being understood that the embodiments shown and described have been selected as representative examples including presently preferred embodiments plus others indicative of the nature of changes and modifications that come within the spirit of the invention(s) being disclosed and within the scope of disclosures(s) as claimed in this and any other applications that incorporate relevant portions of the present disclosure for support of those claims. Undoubtedly, other "variations" based on the teachings set forth herein will occur to one having ordinary skill in the art to which the present invention most nearly pertains, and such variations are intended to be within the scope of the present disclosure and of any claims to invention supported by said disclosure.

What is claimed is:

1. A method of molding a curved opening in a pallet, said method comprising:
   a) obtaining use of a pallet mold, said pallet mold comprising a plurality of openings on at least one side of said pallet mold;
   b) obtaining use of a rotomold machine, said rotomold machine comprising a frame capable of supporting said pallet mold, and said frame comprising a plurality of pivotal frame doors each corresponding to one of said openings of said pallet mold;
   c) securing said pallet mold into said frame;
   d) attaching at least one of a plurality of asymmetric mold cores to a corresponding one of a plurality of said pivotal frame doors such that the at least one of a plurality of said asymmetric mold cores is positioned perpendicular to the face of the mold, said at least one asymmetric mold core of said plurality of asymmetric mold cores comprising:
      i) a base, said base attachable to an inside of said corresponding pivotal frame door;
      ii) a bottom section, said bottom section integral at a distal end thereof to said base, and said bottom section comprising a bottom convex curve having a bottom convex curve radius and a bottom convex curve rotational center;
      iii) a top section, said top section integral at a distal end thereof to said base, said top section comprising a top convex curve, said top convex curve having a top convex curve radius and a top convex curve rotational center, said corresponding pivotal frame doors each configured to actuate a respective one of said at least one mold core, and said top and bottom curve rotation centers being different such that said actuation takes place about the bottom curve rotation center;
iv) a first side section, said first side section positioned and integral at a distal end thereof to said base and positioned between and integral with said bottom section and said top section;
v) a second side section, said second side section positioned and integral at a distal end thereof to said base and positioned between and integral with said bottom section and said top section, and said second side section positioned parallel to said first side section; and
vi) a face, said face positioned at a proximal end of all of the following:
1) said first side section;
2) said second side section;
3) said bottom section; and
4) said top section, with a height of said face being shorter than a height of said base;
e) closing said pivotal frame doors by said actuation such that said corresponding asymmetric mold cores each extend through one of said plurality of said openings of said pallet mold;
f) adding uncured plastic within said pallet mold;
g) heating and rotating said mold until said plastic is cured into said pallet; and
h) removing said pallet from said mold.

2. The method of claim 1, wherein each of said mold core further comprises a pass through opening to allow for air or heat to circulate.

3. The method of claim 2, wherein the width of the mold core surrounding said pass through ranges from about one-half inch to about two inches.

4. The method of claim 1, further comprising a flange positioned distal and integral to each of said mold core.

5. The method of claim 4, wherein said flange of each of said mold core is attachable to said corresponding frame door by an attachment item selected from the group consisting of screws, bolts, and clamps.

6. The method of claim 5, wherein said flange of each of said mold core further comprises thread footings into which a respective screw or bolt is attached through said corresponding frame door into said thread footings.

7. A method of molding a curved opening in a plastic item, said method comprising:
a) obtaining use of a mold, said mold comprising a plurality of openings on at least one side of said mold;
b) obtaining use of a molding machine, said molding machine comprising a frame capable of supporting said mold, and said frame comprising a plurality of pivotal frame doors each corresponding to one of said openings of said mold;
c) securing said mold into said frame;
d) attaching at least one of a plurality of asymmetric mold cores to a corresponding one of a plurality of said pivotal frame doors such that the at least one of a plurality of said asymmetric mold cores is positioned perpendicular to the face of the mold, said at least one asymmetric mold core of said plurality of asymmetric mold cores comprising:
i) a base, said base attachable to an inside of said corresponding pivotal frame door;
ii) a bottom section, said bottom section integral at a distal end thereof to said base, and said bottom section comprising a bottom convex curve having a bottom convex curve radius and a bottom convex curve rotational center;
iii) a top section, said top section integral at a distal end thereof to said base, said top section comprising a top convex curve, said top convex curve having a top convex curve radius and a top convex curve rotational center, said corresponding pivotal frame doors each configured to actuate a respective one of said at least one mold core, and said top and said bottom curve rotation centers being different so that said actuation takes place about the bottom curve rotation center;
iv) a first side section, said first side section positioned and integral at a distal end thereof to said base and positioned between and integral with said bottom section and said top section;
v) a second side section, said second side section positioned and integral at a distal end thereof to said base and positioned between and integral with said bottom section and said top section, and said second side section positioned parallel to said first side section; and
vi) a face, said face positioned at a proximal end of all of the following:
1) said first side section;
2) said second side section;
3) said bottom section; and
4) said top section, with a height of said face being shorter than a height of said base;
e) closing said pivotal frame doors by said actuation such that said corresponding asymmetric mold cores each extend through one of said plurality of said openings of said mold;
f) adding uncured plastic within said mold;
g) heating and operating said mold until said plastic is cured within said mold into said plastic item; and
h) removing said plastic item from said mold.

8. The method of claim 7, wherein each of said mold core further comprises a pass through opening to allow for air or heat to circulate.

9. The method of claim 8, wherein the width of the mold core surrounding said pass through ranges from about ½" to about 2".

10. The method of claim 7, further comprising a flange positioned distal and integral to each of said mold core.

11. The method of claim 10, wherein said flange of each of said mold core is attachable to said corresponding frame door by an attachment item selected from the group consisting of screws, bolts, and clamps.

12. The method of claim 11, wherein said flange of each of said mold core further comprises thread footings into which a respective screw or bolt is attached through said corresponding frame into said thread footings.

* * * * *